United States Patent Office 2,971,041
Patented Feb. 7, 1961

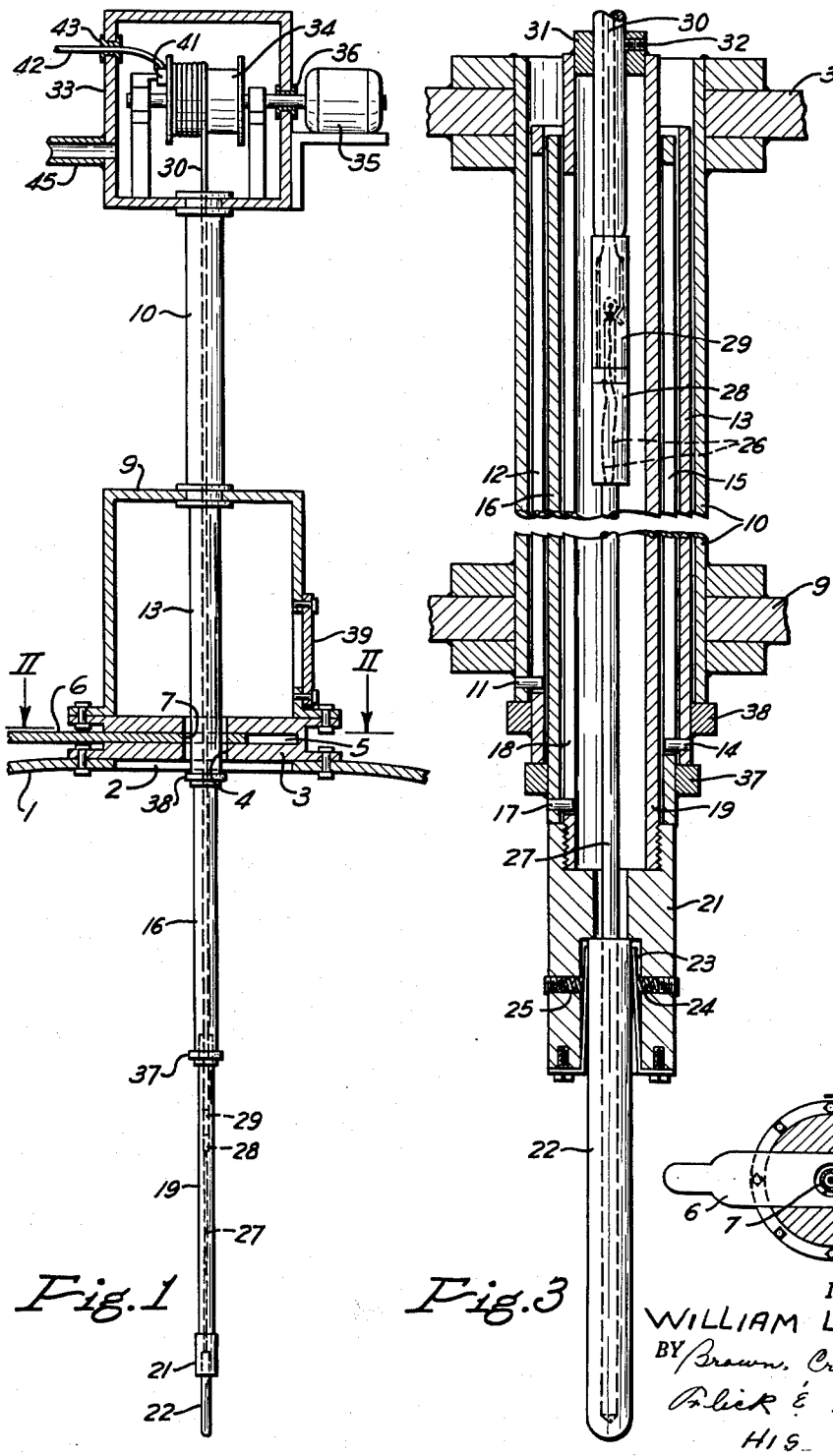

2,971,041

TELESCOPING IMMERSION THERMOCOUPLE

William L. France, Bridgeville, Pa., assignor to Universal-Cyclops Steel Corporation, Bridgeville, Pa., a corporation of Pennsylvania Filed Aug. 24, 1959, Ser. No. 835,661

6 Claims. (Cl. 136—4)

This invention relates to immersion thermocouples, and more particularly to one that can be telescoped to withdraw it from a furnace.

There are two common ways of measuring the temperature of molten metal in a furnace. One is by the use of an optical pyrometer, but the results obtained are not very accurate. The other is by the use of an immersion thermocouple. Such a thermocouple has a temperature responsive element that is immersed in the molten metal when it is desired to take its temperature. The element is connected in an electric circuit that will indicate the temperature. Such thermocouples now in use are cumbersome and are capable of taking only a single reading at a time. The thermocouple is so long in relation to its thickness that it whips around in the furnace chamber. When used with a vacuum furnace, the thermocouple includes a shaft that extends through a seal. If the shaft is rough, it will not slide through the seal properly, and if forced through, it will cause leakage of air into the furnace. Available thermocouple units of this type are operated manually and require extensinve and time-consuming maintenance. Because of their size, such units require two operators to handle them during the operation of taking a reading or of servicing them. For servicing, they have to be dismantled from the furnace.

It is among the objects of this invention to provide an immersion thermocouple, which does not require a sliding seal, which is substantially rigid when in operating position, which is especially suitable for use with a vacuum furnace, which can be removed from a vacuum furnace without removing it from the evacuated atmosphere, which can be serviced without dismantling, which can be handled easily by only one man, which is mechanically operated and which permits multiple readings to be taken.

In accordance with this invention, a housing is provided with a pair of aligned top and bottom openings and is adapted to be mounted on top of a furnace around a hole therein. A tubular shaft extends through the housing openings and into the furnace, the shaft being formed from a plurality of telescoping tubes. The lower end of the largest tube is secured to the housing around its top opening. Projecting from the lower end of the smallest tube is a thermocouple element. A support is mounted on the largest tube and has an opening extending into that tube. The support holds a winding drum, on which is wound an armored cable or lead wire that extends down through the opening and the shaft. Means is provided for anchoring the lower end of the lead wire in the smallest tube so that when the drum is rotated by suitable means it will wind up the lead wire to telescope the shaft and raise the thermocouple element into the housing. A valve may be provided between the housing and the furnace so that the housing can be isolated from the furnace after the thermocouple has been telescoped, whereupon the thermocouple element can be serviced by opening a door in the housing. When used with a vacuum furnace, the winding drum support is a sealed case so that air will not be able to enter the furnace through the tubular shaft.

The preferred embodiment of the invention is illustrated in the accompanying drawings, in which Fig. 1 is a side view of my immersion thermocouple unit mounted on a vacuum furnace and shown partly in vertical section;

Fig. 2 is a reduced horizontal section of the valve taken on the line II—II of Fig. 1; and Fig. 3 is an enlarged fragmentary vertical section of the thermocouple telescoped.

Referring to Fig. 1 of the drawings, the wall of a furnace, such as the upper wall of a vacuum furnace 1, is provided with an opening 2, around which a valve of any suitable construction may be mounted in sealing relation with the furnace. For example, the valve may be a simple slide valve consisting of a flanged body 3 provided with a central vertical opening 4 intersected by a slot 5 that extends inwardly past the opening from one side of the body. A gate 6 is slidably mounted in the slot and projects from it to form a handle. When the gate is in its inner position, it closes the valve opening, but the inner portion of the gate is provided with an opening 7 that can be pulled out into alignment with opening 4 to open the valve.

Mounted on top of the valve is a housing 9 that is open at its bottom, or at least provided with a bottom opening communicating with the valve opening. The top of the housing is provided with an opening in line with valve opening 4. Mounted in the top opening is the lower end of a tube 10 that extends a few feet above the housing. As shown in Fig. 3, the lower end of this tube contains an inwardly projecting pin 11 that extends into a vertical slot 12 in the side of another tube 13 and engages the upper wall of the slot to support the tube, which extends down through the housing and valve and into the furnace. The lower end of tube 13 likewise is provided with a radial pin 14 that projects into a slot 15 in a third tube 16 to support the latter. The third tube has a radial pin 17 projecting into the upper end of a vertical slot 18 in still another tube 19 for the same purpose. These four tubes form a tubular shaft that extends a considerable distance into the furnace, and the tubes are slidably mounted in one another so that the shaft can be telescoped as will be explained presently.

The lower end of the smallest tube 19 supports a chuck 21 provided with means for frictionally gripping the upper end of a tubular protective tip 22 of quartz or the like that has a closed lower end. The gripping means may include a plurality of spring fingers 23 bolted to the lower end of the chuck and extending up into it. The upper portions of the fingers are pressed toward one another by coil springs 24 mounted in radial bores 25 in the side wall of the chuck. The tip 22 contains the hot junction end of a thermocouple element, which consists of the usual two dissimilar wires 26 extending through an insulating tube 27 and having their lower ends welded together to form a temperature responsive element. Tube 27 is formed from short ceramic insulators, so it is quite flexible.

The upper ends of the wires extend out of the insulating tube and are detachably connected in a thermocouple circuit by connecting them to a plug 28 that projects up into a jack 29. The jack is connected to a cable 30 that extends through a plug 31 rigidly mounted in the upper end of the lowest or smallest tube. The cable, which preferably serves as the electric lead wire of the thermocouple, normally is rigidly mounted in the plug by means of a set screw 32 so that the wire can lift the tubes to telescope them. For this purpose, the lead wire extends up out of the tubular shaft and into a case 33 mounted on top of the upper tube 10 and provided in its bottom with an opening communicating with that tube. The case serves as a support for a drum 34, to which the upper end of the lead wire is secured. The drum can be rotated in either direction by a reversible electric motor 35 outside of and also supported by the case, whereby to reel up or pay out the lead wire. The motor shaft extends through a seal 36 in the side of the case.

When the lead wire is reeled up, it will first pull the lowest tube up into the next one until the upper end of chuck 21 engages the lower end of the overlying tube 16, whereupon both tubes will be lifted together. As soon as a collar 37 on the lower end of tube 16 engages the tube above it, the three tubes will be lifted together. A collar 38 on the lower end of tube 13 limits the distance that it can be pulled up into the upper one. When the tubes are fully telescoped in this manner as shown in Fig. 3, the thermocouple element is located inside housing 9 and the valve can be closed below it. Then a door 39 in the side of the housing can be opened to give access to the thermocouple element. By reaching through a door in case 33, set screw 32 can be loosened to allow lead wire 30 to be pushed down through plug 31 to chuck 21. Plug 28 can be pulled out of jack 29 to permit the thermocouple element to be removed from housing 9, and then a new element can be plugged into the jack. The lead wire is then pulled back up through plug 31 to the desired position, and the set screw is tightened again.

The wires in the upper end of cable 32 are connected in a suitable electric circuit by securing them to slip rings (not shown) on one end of the drum. These rings are slidingly engaged by stationary finger or slide wire contacts 41 connected to wires 42 that extend out through one side of the housing. When the thermocouple is used with a vacuum furnace, case 33 is sealed and wires 42 pass through a seal 43.

While the thermocouple is in its upper or telescoped position and the valve is closed, the air in the drum case 33, the telescoped tubular shaft and housing 9 can be evacuated by a suitable vacuum pump connected by a pipe 45 with the case. Then, when the valve is opened, the vacuum in the furnace will not be reduced by air entering from the thermocouple unit.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An immersion thermocouple for a furnace, comprising a housing provided with a pair of aligned top and bottom openings, a tubular shaft extending through said openings and formed from a plurality of loosely telescoping tubes in end to end relation, the lower end of the largest tube being rigidly secured to said housing around its top opening, the remaining tubes being suspended from said lower end of the largest tube, a thermocouple element projecting from the lower end of the smallest tube, a support mounted on said largest tube and having an opening leading into that tube, a winding drum journaled on said support, a cable wound on the drum and extending through said support opening and down through said shaft, means anchoring the lower end of the cable in said smallest tube, and means for driving the drum to rotate it and wind up the cable to telescope the shaft and raise said element into said housing, the housing being adapted to be mounted on top of a furnace around a hole therein to permit said remaining tubes of the tubular shaft to be lowered by gravity into the furnace.

2. An immersion thermocouple for a furnace, comprising a housing provided with a pair of aligned top and bottom openings, a tubular shaft extending through said openings and formed from a plurality of loosely telescoping tubes in end to end relation, the lower end of the largest tube being rigidly secured to said housing around its top opening, the remaining tubes being suspended from said lower end of the largest tube, a thermocouple element projecting from the lower end of the smallest tube, a support mounted on said largest tube and having an opening leading into that tube, a winding drum journaled on said support, an electric lead wire wound on the drum and extending through said support opening and down through said shaft, means anchoring the lower end of the lead wire in said smallest tube, means electrically connecting said element with the lead wire, means for driving the drum to rotate it and wind up the lead wire to telescope the shaft and raise said element into said housing, the housing being adapted to be mounted on top of a furnace around a hole therein to permit said remaining tubes of the tubular shaft to be lowered by gravity into the furnace, and means for connecting the upper end of the lead wire in an electric circuit to evaluate the current created in the thermocouple element.

3. An immersion thermocouple for a vacuum furnace, comprising a housing provided with a pair of aligned top and bottom openings, a valve for closing the bottom opening, a tubular shaft extending through said openings and formed from a plurality of loosely telescoping tubes in end to end relation, the lower end of the largest tube being rigidly secured to said housing around its top opening, the remaining tubes being suspended from said lower end of the largest tube, a thermocouple element projecting from the lower end of the smallest tube, a sealed case mounted on said largest tube and having an opening connecting them, a winding drum journaled in the case, a cable wound on the drum and extending out of said case opening and down through said shaft, means anchoring the lower end of the cable in said smallest tube, means for driving the drum to rotate it and wind up the cable to telescope the shaft and raise said element into said housing, and means for evacuating said case while said element is inside the housing and said valve is closed, the housing and valve being adapted to be mounted on top of a vacuum furnace around a hole therein to permit said remaining tubes of the tubular shaft to be lowered by gravity into the furnace.

4. An immersion thermocouple for a furnace, comprising a housing provided with a pair of aligned top and bottom openings, a tubular shaft extending through said openings and formed from a plurality of loosely telescoping tubes in end to end relation, the lower end of of the largest tube being rigidly secured to said housing around its top opening, the remaining tubes being suspended from said lower end of the largest tube, a thermocouple element projecting from the lower end of the smallest tube, a support mounted on said largest tube and having an opening leading into that tube, a winding drum journaled on said support, a lead wire wound on the drum and extending through said support opening and down through said shaft, means anchoring the lower end of the lead wire in said smallest tube, an electric plug and socket in said smallest tube detachably connecting said element with said wire, means for driving the drum to rotate it and wind up the lead wire to telescope the shaft and raise said element into said housing, the housing being adapted to be mounted on top of a furnace around a hole therein to permit said remaining tubes of the tubular shaft to be lowered by gravity into the furnace, and means for connecting the upper end of the lead wire in an electric circuit to evaluate the current created in the thermocouple element.

5. An immersion thermocouple for a furnace, comprising a housing provided with a pair of aligned top and bottom openings, a tubular shaft extending through said openings and formed from a plurality of loosely telescoping tubes in end to end relation, the lower end of the largest tube being rigidly secured to said housing around its top opening, the remaining tubes being suspended from said lower end of the largest tube, a chuck mounted on the lower end of the smallest tube, a thermocouple element projecting from the lower end of said chuck, a tubular tip closed at its lower end fitting over the projecting portion of said element, resilient means in said chuck gripping the upper end of said tip, a support mounted on said largest tube and having an opening leading into that tube, a winding drum journaled on said support, a cable wound on the drum and extending through said support opening and down through said shaft, means anchoring the lower end of the cable in said smallest tube, and means for driving the drum to rotate it and wind up the cable to telescope the shaft and raise said element into said housing, the housing being adapted to be mounted on top of a furnace around a hole therein to permit said remaining tubes of the tubular shaft to be lowered by gravity into the furnace.

6. An immersion thermocouple for a furnace, comprising a housing provided with a pair of aligned top and bottom openings, a tube extending through said openings and formed from a plurality of loosely telescoping tubular members in end to end relation, the lower end of the largest tubular member being rigidly secured to said housing around its top opening, the remaining tubular members being suspended from said lower end of the largest tubular member, a thermocouple element projecting from the lower end of the smallest tubular member, a support mounted on said largest member and having an opening leading into that tube, a winding drum journaled on said support, an electric cable wound on the drum and extending through said support opening and down through said tube, removable means anchoring the lower end of the cable in the upper end of said smallest tubular member, means detachably connecting said element electrically with said cable, and means for driving the drum to rotate it and wind up the cable to telescope the tube and raise said element into said housing, said smallest tubular member being long enough to project above said support opening when the tube is fully telescoped to give access to said cable anchoring means, the housing being adapted to be mounted on top of a furnace around a hole therein to permit said remaining tubes of the tube to be lowered by gravity into the furnace.

References Cited in the file of this patent

UNITED STATES PATENTS

| | | |
|---|---|---|
| 2,303,704 | Oseland | Dec. 1, 1942 |
| 2,374,377 | Percy | Apr. 24, 1945 |
| 2,547,875 | Krasnow | Apr. 3, 1951 |
| 2,805,273 | Cuthbert | Sept. 3, 1957 |
| 2,815,663 | Lupfer | Dec. 10, 1957 |